United States Patent
Chen

(10) Patent No.: US 8,262,327 B2
(45) Date of Patent: Sep. 11, 2012

(54) DUAL-CONTACT TOOL HOLDER FOR LATHE/MILLER

(75) Inventor: Sung-Tan Chen, Kaohsiung Hsien (TW)

(73) Assignee: Honor Seiki Co., Ltd., Kaohsiung Hsien (TW)

( * ) Notice: Subject to any disclaimer, the term of this patent is extended or adjusted under 35 U.S.C. 154(b) by 1077 days.

(21) Appl. No.: 12/182,143

(22) Filed: Jul. 30, 2008

(65) Prior Publication Data

US 2009/0087277 A1    Apr. 2, 2009

(30) Foreign Application Priority Data

Sep. 29, 2007  (TW) .................. 96136532 A

(51) Int. Cl.
*B23B 31/107* (2006.01)
(52) U.S. Cl. ............ 409/234; 279/2.11; 279/2.23
(58) Field of Classification Search ........... 409/231, 409/233, 234; 279/2.1, 2.11, 2.12, 2.23, 279/66, 76, 87
See application file for complete search history.

(56) References Cited

U.S. PATENT DOCUMENTS

| | | | | |
|---|---|---|---|---|
| 4,680,999 A | * | 7/1987 | Kojima et al. | 82/160 |
| 4,863,323 A | * | 9/1989 | Glaser | 409/232 |
| 5,035,557 A | * | 7/1991 | Kohlbauer et al. | 409/233 |
| 5,193,954 A | * | 3/1993 | Hunt | 409/233 |
| 5,238,341 A | * | 8/1993 | Horsch | 409/233 |
| 6,003,416 A | * | 12/1999 | Ando et al. | 82/160 |
| 6,196,094 B1 | * | 3/2001 | Erickson | 82/158 |

FOREIGN PATENT DOCUMENTS

| | | | |
|---|---|---|---|
| DE | 3839681 A | * | 6/1989 |
| GB | 2154479 A | * | 9/1985 |
| JP | 07299614 A | * | 11/1995 |
| JP | 08243814 A | * | 9/1996 |
| JP | 09141505 A | * | 6/1997 |
| SU | 562390 A | * | 9/1977 |

\* cited by examiner

*Primary Examiner* — Daniel Howell
(74) *Attorney, Agent, or Firm* — Leong C. Lei

(57) ABSTRACT

A dual-contact tool holder is provided for a lathe/miller, including a tool seat having an inner circumferential surface in which a circumferential groove is defined and an operation barrel having a circumferential surface in which holes are defined for receiving therein steel balls. The operation barrel forms a central bore in which a connection bar is movably received. A lid is mounted to an upper end of the operation barrel. The connection bar is coupled to a draw bar of a ram, whereby the draw bar of the ram, when caused to move upward, drives the operation barrel upward via the connection bar, causing the steel balls to move upward and tightly engage the inner circumferential surface of the tool seat to generate a dual constraint force for enhancing the fixing of a tool rest.

1 Claim, 5 Drawing Sheets

DUAL-CONTACT TOOL HOLDER FOR LATHE/MILLER

BACKGROUND OF THE INVENTION (a) Technical Field of the Invention

The present invention relates to a dual-contact tool holder for a lathe/miller, and in particular to a tool holder that provides dual side constraint forces in fixing a tool rest so as to enhance the fixing of the tool rest.

(b) Description of the Prior Art

Prosperity of economy brings the progress of industrial technology. To improve market competitiveness, every manufacturer in every industry spends a lot of effort and cost in development and research. For machining operation, lathes and milling machines are almost a must and are often employed to perform various turning and milling based machining operations. These machine tools are operated by fixing, in a position adjustable manner, a tool or cutter with respect to a work piece by a tool holder device, an example of which is illustrated in FIG. 1 of the attached drawings, wherein a draw bar 12 is provided at an end of a ram 11 to couple a tool seat 13 and a tool rest 14 is fixed to the underside of the tool seat by bolts. Hydraulic force is employed to drive the ram 11, which in turn causes the draw bar 12 to move the tool seat 13 up and down. Such a device is effective in fixing or holding the tool rest 14, but since the draw bar 12 of the ram 11 is operated by hydraulic power, which although providing a substantially constant force in carrying out the operation, is subjected to certain compressibility, which leads to minor discrepancy. Consequently, minor difference of force may occur on the tool rest during a turning or milling operation, affecting the precision of the machining operation. FIG. 2 of the attached drawings illustrates another known tool holder, wherein a tool seat 22 has an extension that forms a reduced coupling section 23 by which the tool seat 22 is coupled to a ram 21 located above, and a tool rest 24 is coupled to the underside of the tool seat 22 by bolts. By being driven by the ram 21, the tool seat 22 is caused to displace, which in turn leads to displacement of the tool rest 24 for carrying out turning or milling operation. Such a known tool holder provides only a reduced drawing force due to the reduced dimension of the coupling section 23, and as a consequence, the operation of turning or milling is affected. Apparently, this is a device that can be further improved. To conclude, both known tool holders discussed above are desired to be further improved.

SUMMARY OF THE INVENTION

The primary purpose of the present invention is to provide a dual-contact tool holder for a lathe/miller, comprising a tool seat having an inner circumferential surface in which a circumferential groove is defined and an operation barrel having a circumferential surface in which holes are defined for receiving therein steel balls. The operation barrel forms a central bore in which a connection bar is movably received. A lid is mounted to an upper end of the operation barrel. The connection bar is coupled to a draw bar of a ram, whereby the draw bar of the ram, when caused to move upward, drives the operation barrel upward via the connection bar, causing the steel balls to move into and engage the circumferential groove so as to securely fix of a tool rest.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
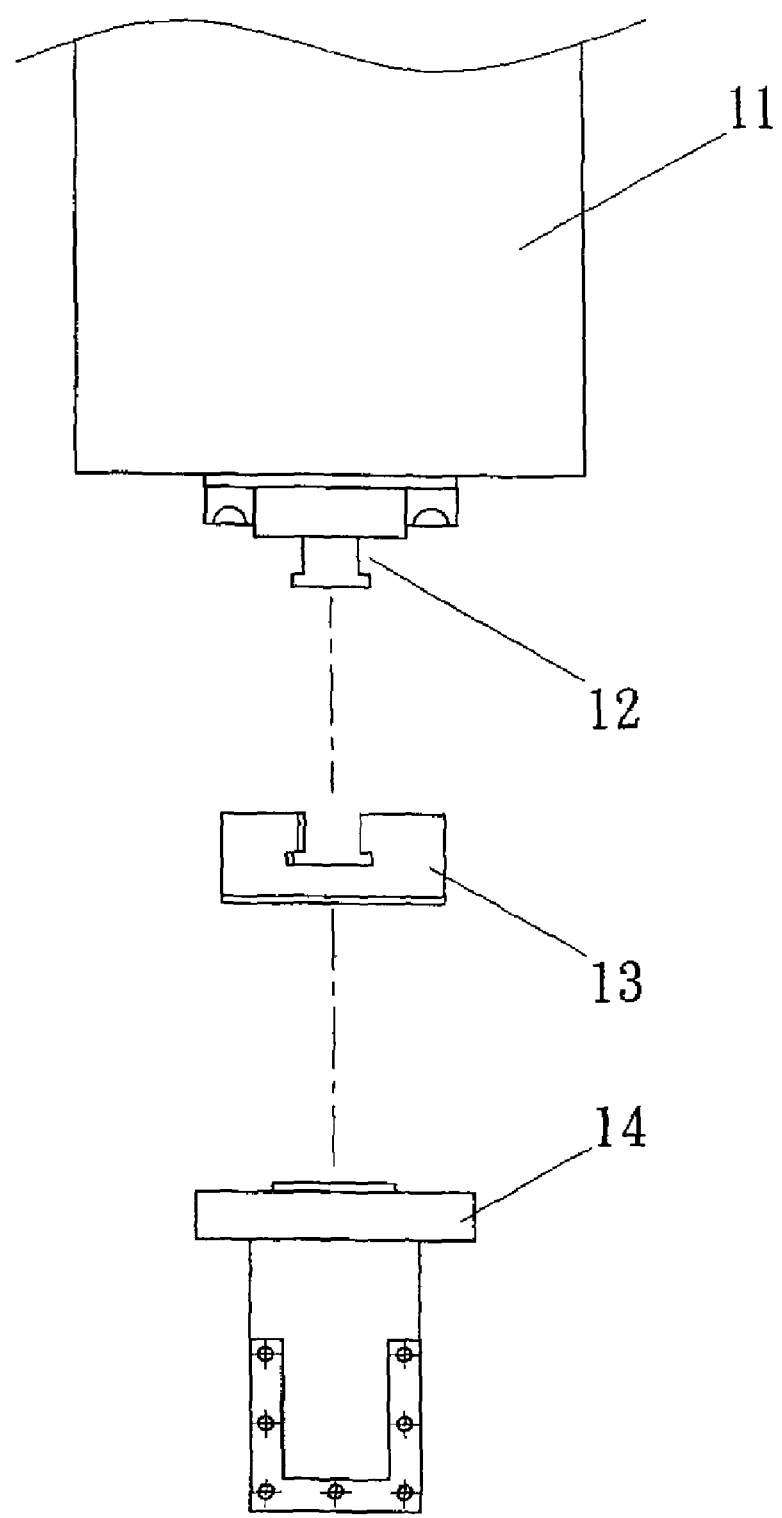
FIG. 1 is a schematic view illustrating a conventional tool holder device.
Figure 2:
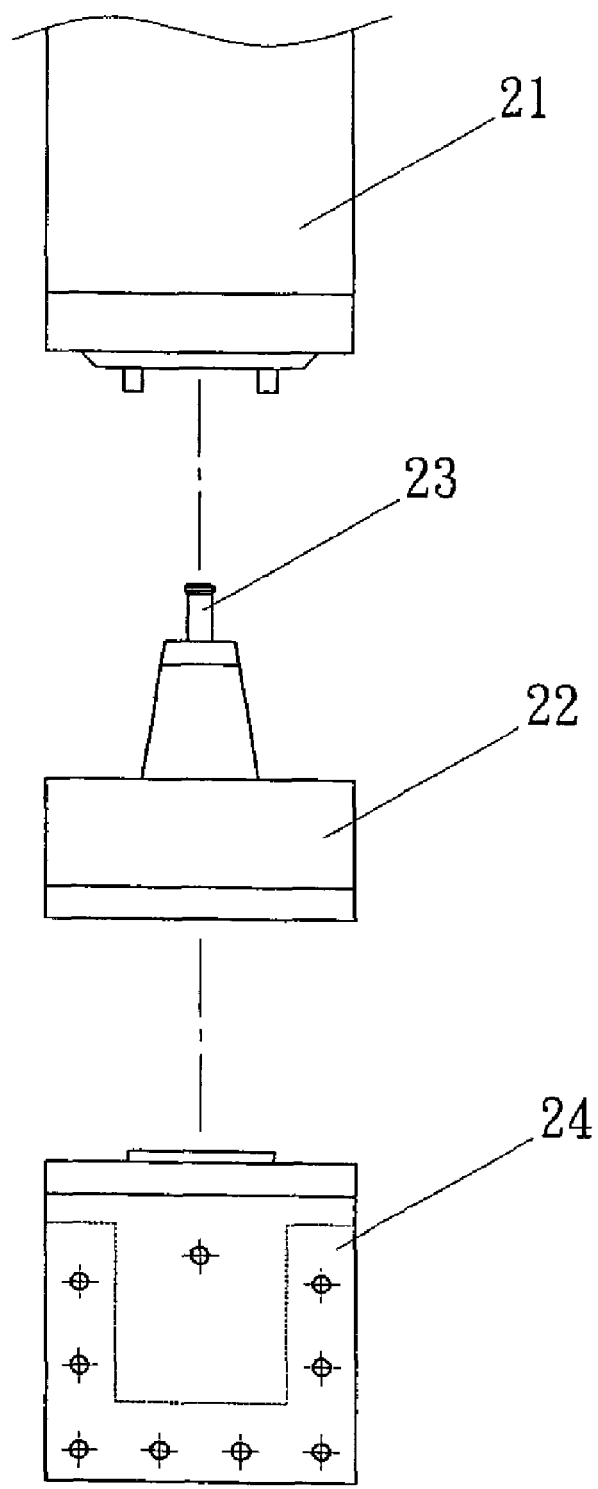
FIG. 2 is a schematic view illustrating another conventional tool holder device.
Figure 3:
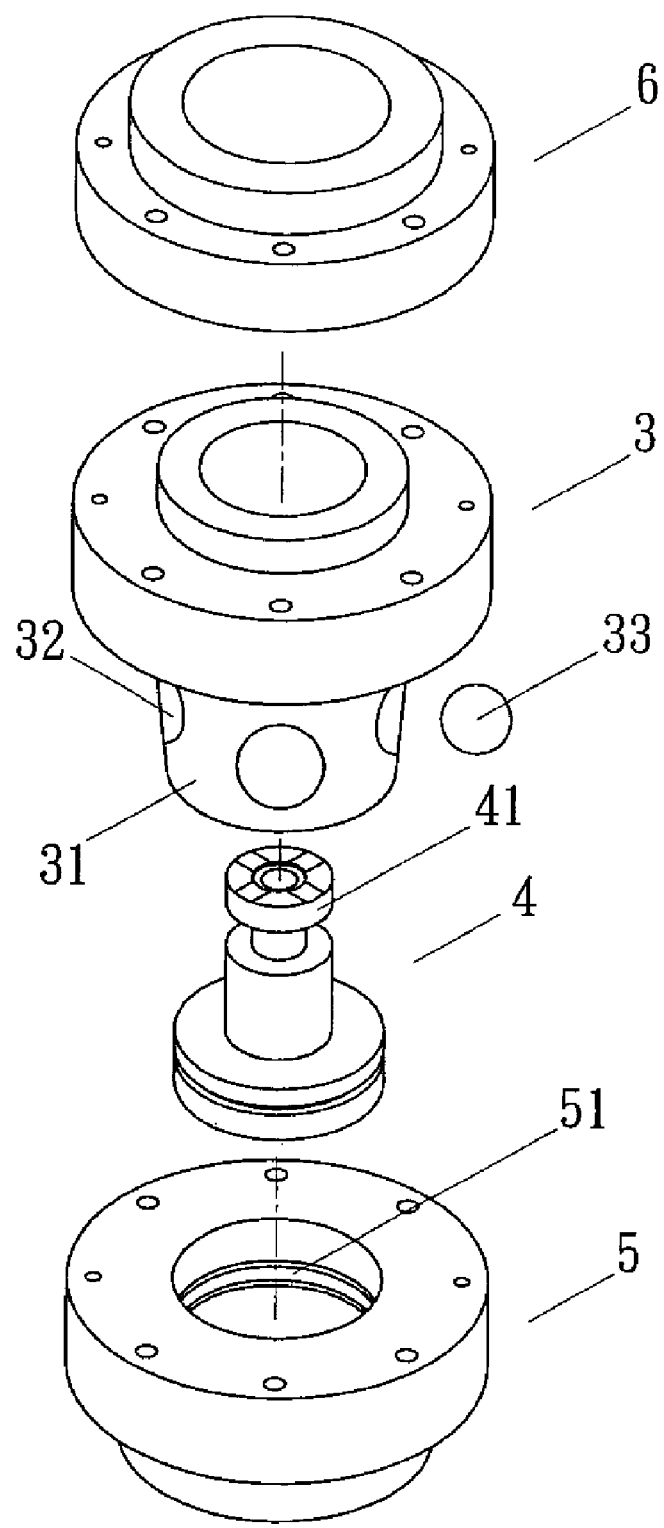
FIG. 3 is an exploded view illustrating a tool holder in accordance with the present invention.

With reference to the drawings and in particular to FIG. 3, a tool holder constructed in accordance with the present invention comprises an operation barrel 3, a connection bar 4, a tool seat 5, and a lid 6. The operation barrel 3 is of a cylindrical shape having a lower end that forms an axle 31. The axle 31 has a circumferential surface in which a plurality of holes 32 is defined for receiving therein steel balls 33. The lid 6 is secured to an upper end of the operation barrel 3 by means of for example bolts. The operation barrel 3 forms a central bore in which the connection bar 4 is received. The connection bar 4 has an upper end forming a pawl 41 that functions to couple with a draw bar of a ram. The tool seat 5 is in the form of a hollow ring having an inner circumferential surface in which a recessed, circumferentially extending groove 51 is formed. The groove 51 corresponds in position to the holes 32 of the operation barrel 3.

Figure 4:
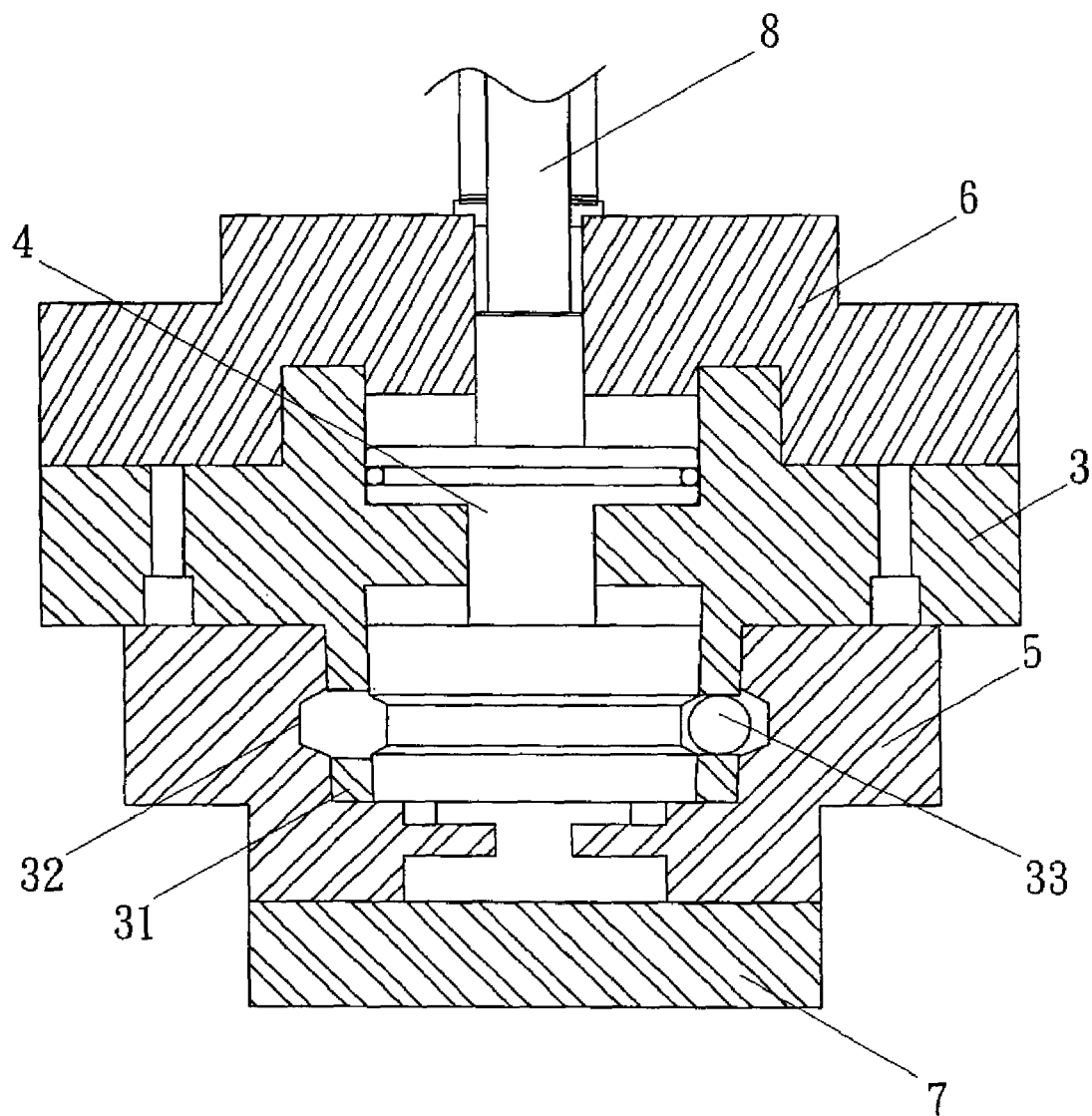
FIG. 4 is a cross-sectional view of the tool holder of the present invention in a released condition.
Figure 5:
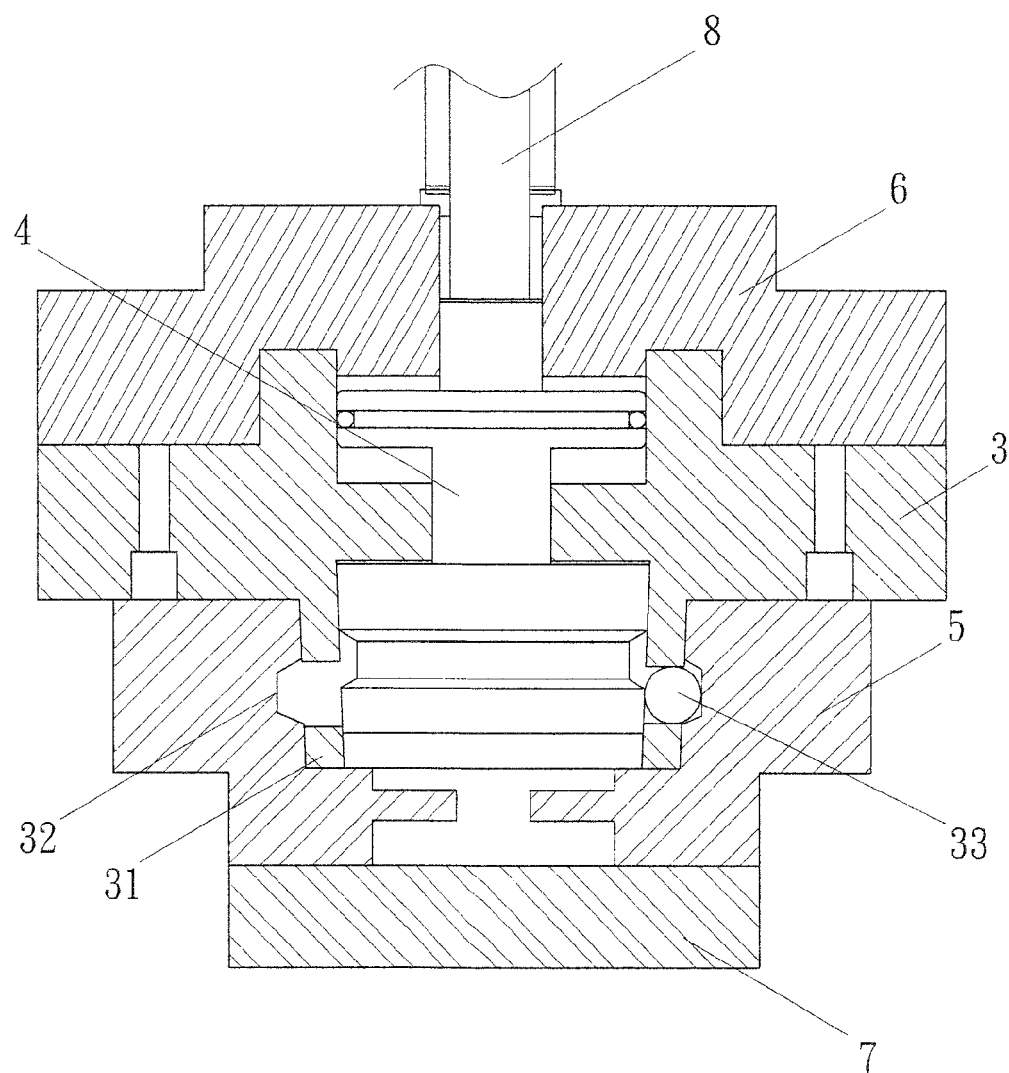
FIG. 5 is a cross-sectional view of the tool holder of the present invention in a restrained condition.

To demonstrate the operation of the tool holder in accordance with the present invention, reference is now made to FIG. 4, which illustrates a released condition of a tool rest. In the released condition, the circumferential groove 51 of the tool seat 5 opposes the holes 32 of the operation barrel 3 and the steel balls 33 are allowed to move from the holes 32 from the circumferential groove 51 of the tool seat 5 through the holes 32 to be partially received in a circumferential groove that is defined in connection bar and has opposite side walls spaced by a distance corresponding to the size of the steel balls 3, whereby the tool rest 7 that is located below the tool seat 5 is released. Also referring to FIG. 5, when the draw bar 8 of the ram is operated, the draw bar 8 drives upward the connection bar 4 received in the bore of the operation barrel 3, thereby causing the connection bar 4 to move upward with respect to the operation barrel 3. With the upward movement of the 3 connection bar 4, the steel balls 33 are forced by the caroming side walls of the connection bar 4 to get into and tightly engage the circumferential groove 51 of the tool seat 5 to form a tightly restrained condition. Due to the tight engagement effected by the steel balls 33, a dual constraint force is generated, which eliminates the problems of undesired tiny shifting or displacement of the tool rest 7 and small drawing force, ensuring proper progress of turning or milling operation, improving machining precision of work pieces, and frilly exploiting cutting force of the tool.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A tool holder adapted for use in a lathe/miller, comprising an operation barrel, a connection bar, a tool seat, and a lid, wherein the operation barrel is of a cylindrical shape having a lower end that forms an axle having a circumferential surface in which a plurality of holes is defined for receiving therein steel balls, the lid being secured to an upper end of the operation barrel, the operation barrel forming a central bore in which the connection bar is movably received, the connection bar having an upper end forming a pawl adapted to couple with a draw bar of a ram, the connection bar forming a circumferential groove that is selectively set in alignment with the holes when the connection bar is moved relative to the operation barrel, the tool seat being in the form of a hollow ring having an inner circumferential surface in which a recessed, circumferentially extending groove is formed, the groove delimited by opposite side walls and corresponding to the holes of the operation barrel.

* * * * *